(12) United States Patent
Goergen et al.

(10) Patent No.: US 10,694,604 B2
(45) Date of Patent: Jun. 23, 2020

(54) LIGHTING CONTROLLER, LIGHTING SYSTEM AND CONFIGURATION METHOD

(71) Applicant: SIGNIFY HOLDING B.V., Eindhoven (NL)

(72) Inventors: Daniel Martin Goergen, Eindhoven (NL); Song Heng Chua, Singapore (SG); Ying Zhao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/577,904

(22) PCT Filed: May 12, 2016

(86) PCT No.: PCT/EP2016/060736
§ 371 (c)(1),
(2) Date: Nov. 29, 2017

(87) PCT Pub. No.: WO2016/192953
PCT Pub. Date: Dec. 8, 2016

(65) Prior Publication Data
US 2018/0168018 A1 Jun. 14, 2018

(30) Foreign Application Priority Data
May 29, 2015 (EP) .................................... 15169953

(51) Int. Cl.
*H05B 47/105* (2020.01)
*H05B 47/19* (2020.01)
*G08B 7/06* (2006.01)

(52) U.S. Cl.
CPC ............. *H05B 47/105* (2020.01); *G08B 7/06* (2013.01); *H05B 47/19* (2020.01)

(58) Field of Classification Search
None
See application file for complete search history.

(56) References Cited

U.S. PATENT DOCUMENTS

| | | | | |
|---|---|---|---|---|
| 8,909,382 B1 * | 12/2014 | Malakuti | ............ | H05B 37/0227 700/296 |
| 9,746,371 B1 * | 8/2017 | Kumar | ............... | H05B 37/0218 |
| 2005/0183489 A1 | 8/2005 | Weinberg et al. | | |
| 2007/0272831 A1 * | 11/2007 | Dailey | ............... | H05B 37/0218 250/214 AL |
| 2011/0276193 A1 * | 11/2011 | Bowman | ............... | H05B 37/029 700/295 |
| 2011/0276196 A1 | 11/2011 | Nishikawa et al. | | |
| 2011/0301885 A1 | 12/2011 | Tam et al. | | |
| 2012/0025717 A1 * | 2/2012 | Klusmann | .......... | H05B 37/0218 315/152 |

(Continued)

FOREIGN PATENT DOCUMENTS

| | | |
|---|---|---|
| CN | 104093244 A | 10/2014 |
| EP | 2709428 A2 | 3/2014 |
| WO | 2015028921 A1 | 3/2015 |

*Primary Examiner* — Crystal L Hammond
(74) *Attorney, Agent, or Firm* — Meenakshy Chakravorty

(57) ABSTRACT

A lighting system controller for a lighting system having lighting units and sensors which together form a communications network. A new sensor may be added to the network as a new network node. In response to this, a high sensitivity mode is implemented, for assisting the user in testing the new sensor function.

13 Claims, 2 Drawing Sheets

(56) References Cited

U.S. PATENT DOCUMENTS

| | | | | |
|---|---|---|---|---|
| 2014/0001959 A1* | 1/2014 | Motley | ............... | H05B 37/02 |
| | | | | 315/149 |
| 2014/0239817 A1* | 8/2014 | Leinen | ............... | H05B 37/02 |
| | | | | 315/152 |
| 2015/0108901 A1* | 4/2015 | Greene | ............. | H05B 37/0218 |
| | | | | 315/149 |

* cited by examiner

LIGHTING CONTROLLER, LIGHTING SYSTEM AND CONFIGURATION METHOD

CROSS-REFERENCE TO PRIOR APPLICATIONS

This application is the U.S. National Phase application under 35 U.S.C. § 371 of International Application No. PCT/EP2016/060736, filed on May 12, 2016, which claims the benefit of European Patent Application No. 15169953.5, filed on May 29, 2015. These applications are hereby incorporated by reference herein.

FIELD OF THE INVENTION

This invention relates to lighting controllers and lighting systems, in particular lighting systems which combine lighting units and sensors into a user-configurable network.

BACKGROUND OF THE INVENTION

Lighting systems have become increasingly flexible and configurable, in part due to the controllability of LED light sources. In 2012, Philips (Trade Mark) launched the Philips Hue system. This networked lighting system comprises a set of intelligent lights and a controller (called a Bridge). The system allows, for example, color and brightness control of the lights from a smartphone or tablet. The lighting control may be automated based on sensed conditions. Examples of available sensors are motion sensors, door/window sensors, temperature sensors and humidity sensors. The Hue system allows for ZigBee and IP based sensors to be added to the network. Such sensors can then control the various lights. The purpose of each sensor is generally for the activation of that sensor to trigger a lighting effect.

Users may add a sensor to a networked lighting system. In general such a system does not give useful feedback to a user when a sensor device is added to the lighting system. This leaves a user in doubt about whether the sensor and/or the networked lighting system has been correctly configured and whether the sensor is operational. There is a need for an intuitive method to provide acknowledgement that the setup of the sensor has been successful.

SUMMARY OF THE INVENTION

The inventors have realized that a user is likely to want to try out a new sensor to see if it works. For example, when a presence sensor has been installed, the user may wave a hand in front of the sensor to see if the required lights are turned on. As a further example, when a temperature sensor has been installed a user may blow onto the sensor to see if the lights are controlled as configured.

In a first aspect, there is provided a lighting system controller, for controlling one or more lighting units. The lighting system controller is arranged for:

enabling addition, by a user, of a sensor as a new network node to the networked lighting system, receiving sensor information from the sensor, and providing wireless control signals to the one or more lighting units in dependence upon the received sensor information, wherein the lighting system controller is further arranged for:

in response to addition of the sensor, temporarily switch from a normal operation mode to a high sensitivity mode for assisting the user in testing the sensor function, wherein in the high sensitivity mode the lighting system controller controls the networked lighting system such that there is a changed sensor threshold level compared to the sensor threshold level in the normal operational mode, and/or such that there is an increased sensor sensitivity compared to the sensor sensitivity in the normal operational mode, and/or such that there is an increased frequency of communications between the lighting system controller and the sensor compared to the frequency of communications in the normal operational mode.

In this way, the controller responds to a sensor having been added to the system by providing a high sensitivity mode. In this high sensitivity mode, the triggering of the sensor between output values is more likely as a result of the increased sensitivity. The sensitivity is increased compared to a normal operational mode.

The increased sensitivity may be manifested in different ways. The aim is to make it easier to trigger the sensor to respond, so that the user can easily test the sensor function by providing a suitable stimulus to the sensor.

The controller may comprise the so-called Bridge of a wireless lighting control system.

The high sensitivity mode may comprise a high sensitivity mode of the new sensor. This means the sensor itself may be made to generate an output more easily than in the normal operating mode.

The high sensitivity mode may instead comprise a high sensitivity mode of the controller in response to the signals received from the new sensor. This means the controller is made to respond more easily to the signals received from the sensor.

The high sensitivity mode may for example make use of an increased frequency of communications between the controller and the new sensor compared to the frequency of communication in normal use of the system. For example, the sensor may push sensor information to the controller at a higher frequency, or the controller may pull sensor information from the sensor at a higher frequency. The maximum number of messages sent by the controller may be increased.

The mode may thus end automatically after a fixed time, or after the sensor testing is deemed complete, or else the user may have the option to end the high sensitivity testing mode.

In one example, the new sensor is a sensor with hysteresis, for example a temperature sensor or an open/close sensor, and the high sensitivity mode makes use of a reduced hysteresis between sensor output transitions compared to the hysteresis in normal use of the system.

The hysteresis prevents the sensor output fluctuating rapidly in response to small temperature changes. By reducing this hysteresis, the temperature sensor is made to transition more easily and the sensitivity is increased. This makes it easier to force the sensor to generate a varying output. The hysteresis may be dropped to zero.

In another example, the new sensor is a sensor with delayed transition between outputs, for example a presence detector, and the high sensitivity mode makes use of a reduced delay between sensor output transitions compared to the delay in normal use of the system. The delay may for example be used to prevent lights turning off immediately after a presence is no longer detected. By reducing this delay, it is easier and quicker to test the presence detection output and the no-presence detection output. The delay may be reduced to zero.

In an embodiment of the lighting system controller according to the first aspect, in the high sensitivity mode the networked lighting system operates with a changed sensor threshold level, and wherein the changed threshold level comprises a reduced hysteresis between sensor output transitions. As an example, the hysteresis may be lowered or the hysteresis may be made inactive (e.g. set to zero).

In a further embodiment of the lighting system controller according to the first aspect, in the high sensitivity mode the networked lighting system operates with a changed sensor threshold, and wherein the changed threshold level comprises a reduced delay between sensor output transitions. As an example, the delay may be lowered or the delay may be made inactive (e.g. set to zero).

In yet another embodiment of the lighting system controller according to the first aspect, the high sensitivity mode ends after a fixed time period; or wherein the high sensitivity mode ends after a fixed time period in which there are no transitions in sensor output; or wherein the high sensitivity mode ends based on receiving a user input.

In a second aspect, a networked lighting system is provided, the system comprising: a lighting system controller according to the first aspect; one or more lighting units; and one or more sensors, wherein the one or more lighting units, the one or more sensors and the lighting system controller form a network.

In an embodiment of the networked lighting system according to the second aspect, the system further comprises an output device for assisting the user in testing the sensor function, wherein the output device comprises: at least one of the one or more lighting units; and/or a portable display device for providing performance information to the user; and/or a speaker.

According to a third aspect, a method is provided for operating a lighting system controller for controlling a networked lighting system comprising one or more lighting units. The method comprising:

detecting the addition of a sensor, by a user, as a new network node to the networked lighting system;

receiving sensor information from the sensor, providing wireless control signals to the one or more lighting units in dependence upon the received sensor information, and in response to addition of the sensor, temporarily switch from a normal operation mode to a high sensitivity mode for assisting the user in testing the sensor function, wherein in the high sensitivity mode the networked lighting system is controlled such that there is a changed sensor threshold level compared to the sensor threshold level in the normal operational mode, and/or such that there is an increased sensor sensitivity compared to the sensor sensitivity in the normal operational mode, and/or such that there is an increased frequency of communications between the lighting system controller and the sensor compared to the frequency of communications in the normal operational mode.

As explained above, the high sensitivity mode may comprise a high sensitivity mode of the new sensor or a high sensitivity mode of the controller in response to the signals received from the new sensor.

In an embodiment of the method according to the third aspect, the high sensitivity mode comprises a high sensitivity mode of the sensor or a high sensitivity mode of the lighting system controller.

In a further embodiment of the method according to the third aspect, the method further comprises determining from the type of the sensor whether the high sensitivity mode is to be implemented by the sensor or by the lighting system controller.

In various embodiment of the method according to the third aspect, in the high sensitivity mode the networked lighting system operates with a changed sensor threshold level, and wherein the changed threshold level comprises a reduced hysteresis between sensor output transitions; and/or in the high sensitivity mode the networked lighting system operates with a changed sensor threshold level, and wherein the changed threshold level comprises a reduced delay between sensor output transitions. As an example, the hysteresis may be lowered or the hysteresis may be made inactive (e.g. set to zero). As a further example, the delay may be lowered or the delay may be made inactive (e.g. set to zero).

In yet another embodiment of the method according to the third aspect, the high sensitivity mode ends after a fixed time period; or wherein the high sensitivity mode ends after a fixed time period in which there are no transitions in the sensor output; or wherein the high sensitivity mode ends based on receiving a user input.

According to a fourth aspect a computer program product is provided. The computer program product comprising code stored on a computer readable storage medium and configured when executed to implement the method according to the third aspect.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting system controller for a lighting system having lighting units and sensors which together form a communications network. A new sensor may be added to the network as a new network node. In response to this, a high sensitivity mode is implemented, for assisting the user in testing the new sensor function.

Figure 1:
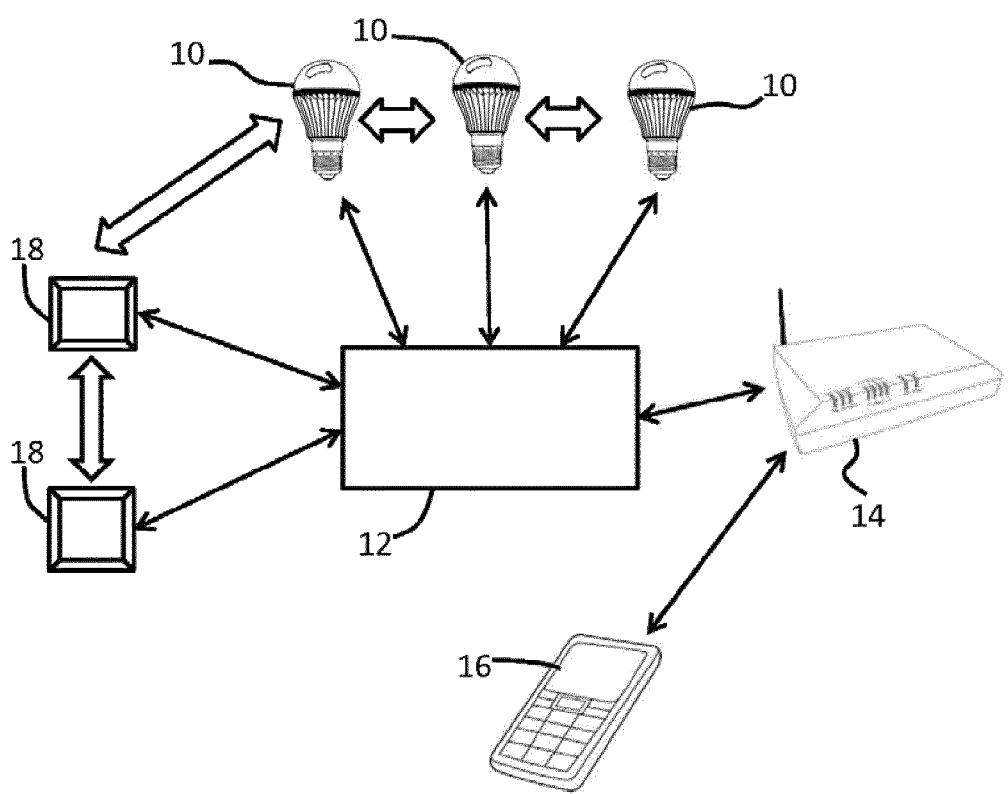
FIG. 1 shows a lighting system.

FIG. 1 shows a lighting system, comprising a set of intelligent lights 10 which are controlled by a controller 12 (sometimes known as a Bridge). The controller 12 connects to a wireless router 14 for example using the WiFi protocol.

The controller 12 forms a communications network between the lights 10 and enables individual lights or groups of lights to be controlled.

An application is loaded onto a smartphone or tablet 16, and this enables a user to send commands to the system controller via the wireless router 14. The controller creates a mesh network around the home, with the lights 10 connected to each other and also to the controller 12. Not all lights need to be in range of the controller, as information can be shared across the network with communication between the lights.

The lighting control may be automated based on sensed conditions, and for this purpose sensors 18 are provided which also communicate with the controller 12, and form nodes of the mesh network. Examples of possible sensors are motion sensors, door/window sensors, temperature sensors, light sensors and humidity sensors.

To the extent described above, the system is known, and for example is implemented by the commercially available Philips Hue system. Other systems are also commercially available which provide the same functionality as described above.

This invention relates to an additional function of the controller 12 which enables a user to verify the correct networking and functioning of a sensor which is added to the system. The invention may be implemented as additional software in the controller 12 and optionally also in the sensors, and the overall architecture of the system remains as shown in FIG. 1.

The additional functionality provides a high sensitivity mode when a new sensor is added to the system, for assisting the user in testing the new sensor function.

To introduce a new sensor into the system architecture, a user connects the sensor to the system. The standard configuration process then follows, which enables the user to configure the sensor rules. In particular, using the device 16, the user is able to define how the sensed information is to be used to control the lights 10.

The defined rules are then applied to the system, but in a high sensitivity mode which enables the user to test the operation, or simply receive feedback that the system works. Optionally, the network is also set to a fast response mode during this time. This means the polling of sensor devices by the controller 12 is performed more frequently, so that communication speeds can be increased.

The high sensitivity mode renders the sensors more responsive, so that the desired changes in lighting conditions in response to the parameter being sensed are made to take effect more easily. Some examples of how this is achieved are presented below.

After the high sensitivity mode, the rules are applied in a normal operational mode and the network returns to its normal operational mode.

The fast response mode (if employed) provides an increased frequency of communications between the controller and the new sensor compared to the frequency of communication in normal use of the system. An increased polling speed means that the number of times per minute the sensor is polled by the controller is increased, or else the number of times per minute the sensor pushes its status to the controller is increased.

Thus, the controller can poll the sensor more frequently, or the sensor can report more frequently. This may involve fixed report intervals which are of reduced duration. Alternatively, the report intervals may not be fixed but may be event based. In this case, a maximum report frequency may be increased. For example, a maximum report frequency may be 1 message per 10 seconds during normal operation, but this can be increased to 1 message per second during the fast response mode. These approaches may be used in combination.

For example, a temperature and humidity sensor may send information at an increased rate but with fixed report intervals. A motion sensor or an open/close sensor may additionally be permitted to send more event-based reports than would be permitted during normal operation, to allow the user to test that the event is recognized by the system more quickly (the "event" being the open or closing, or presence of motion).

The concept of increasing the communication frequency between the sensor and controller may also be applied to the communication between the controller and the user interface, such as the smartphone. For example, it is possible to increase the polling speed between the smartphone and the bridge when the user executes the test mode.

In one example, the new sensor is a temperature sensor. For example, the sensor may provide a signal when the temperature is above 24 degrees. During normal operation, the sensor may be designed to filter out small changes around this trigger point to avoid lights from turning on at 24.1 degrees and then off again at 24.0 degrees. Thus, a hysteresis may be introduced into the switching of the sensor output between two discrete states (one indicating at or above 24 degrees and one indicated below 24 degrees). During the high sensitivity mode, this hysteresis may be reduced or made inactive. In this way, the user may be able to blow onto the sensor to create rapid temperature changes that turn the lights on and off, which can then be visually confirmed. In this way, the temperature sensor is made to transition more easily and rapidly between its outputs, and the sensitivity is increased.

This approach does not require the sensor to give only a single binary output as in the example above. It may be used to detect multiple temperature ranges, so that the lighting system can be controlled in a number of different ways corresponding to different temperature ranges. In this case, there may be multiple temperature thresholds, for example to indicate very cold conditions, normal conditions, or extremely high temperature conditions.

In another example, the new sensor is a presence detector. During normal operation, a delay may be used to avoid the lights being turned off when a person does not move for a while (and the sensor does not detect movement). During the high sensitivity mode this delay may be reduced or made inactive. This allows the user to move his/her hand in view of the sensor to turn on the lights and when the movement stops the lights will turn off straight away, again enabling visual confirmation that the sensor is correctly installed and functioning.

In another example, the new sensor is an open/close sensor (for example applied to a door, window or appliance). As mentioned above, increased communication frequency will enable a more rapid evaluation of the system operation. In addition, a magnetic sensor as used within an open/close sensor will typically also include hysteresis rules or thresholds which can be adapted for the high sensitivity mode in the manner explained above.

In another example, the new sensor is a light sensor. The user is likely to use a cover to perform sensor testing, so only one threshold is needed which is crossed when almost no light is received. This will be a different threshold rule to that which is applied during normal operation. Thus, a threshold adjustment may be carried out as part of the high sensitivity mode.

Depending on where the trigger signal is created, which trigger signal controls the change in light output configuration (e.g. on/off, or a color change or a brightness change), the high sensitivity mode is implemented in different parts of the system.

For example if the sensor sends the trigger to the controller (i.e. the sensor stores the trigger value and itself determines when a trigger is generated), then the sensor itself is set to the high sensitivity mode.

If the controller stores the trigger value (i.e. the sensor generates a continuously varying output signal and the controller determines whether the value creates a trigger), then the controller is set to the high sensitivity mode.

The examples above show that there are various options for system changes that take place during the high sensitivity mode. These include increased sensor sensitivity, changed sensor threshold levels, changed sensor hysteresis, and faster communication between the sensor and the controller.

There are different ways to provide information to the user that the system is functioning. One approach is for the user to inspect visually the effect on the lighting, when the sensor is used to provide automated lighting control. However, the user interface (e.g. smartphone) may instead relay system function information to the user so that the user interface provides the performance information to the user rather than (or as well as) visually inspection of lighting changes. In this case, the faster communication between the controller and the user interface (e.g. smartphone) mentioned above assists in providing rapid feedback to the user.

There may additionally or alternatively be special rules which are implemented in the controller to trigger a different light output as an indication to the user that the system is functioning, for example the lights may be controlled in a certain way to provide a recognizable indication for the user. Other output devices may be provided, such as dedicated LEDs, or a speaker as part of the sensor itself to provide information to the user. The user may receive multiple feedback indications concerning the system function which can be compared. For example, the user may receive feedback from the sensor itself which indicates that the sensor is working, but may also receive feedback from the system controller via the smartphone that the sensor is not correctly functioning within the overall system.

Figure 2:
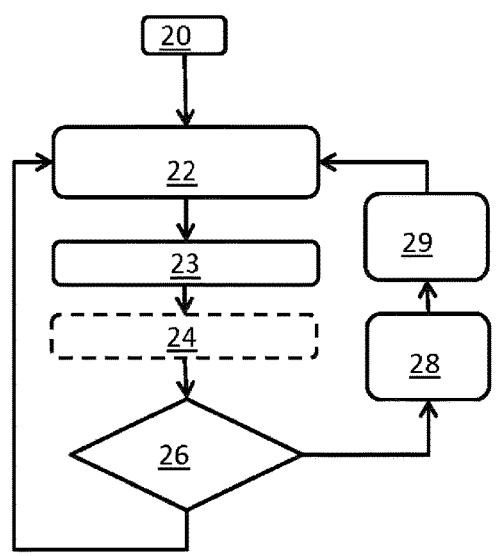
FIG. 2 shows a configuration method.

FIG. 2 shows a method of configuring the lighting controller.

The process starts in step 20.

In step 22, the controller monitors the sensors, and in step 23, the lights are controlled in accordance with the sensor signals. This represents the normal system operation.

In step 24, a sensor is added to the network, resulting in a new network node, and is configured by user. This is shown dotted, as this step only arises infrequently within the monitoring cycle. It does not arise during normal operation of the system, only during an initial configuration or during a later upgrade of the system.

In step 26, the controller determines if a new network node has been added.

If a new network node has been added, the type of device which has been added is detected in step 28, for example the type of sensor.

Based on the type of sensor, it is established if the sensor itself or the controller needs to implement the high sensitivity mode.

The high sensitivity mode is implemented in step 29. This may involve increased frequency of communications and/or other measures to increase the responsiveness of the sensor to the stimulus being sensed, as explained above.

The user may be provided with feedback via the application on the device 16 to indicate that this mode is active. This allows the user to switch back to normal operational mode when the testing has been completed.

During the high sensitivity mode, various settings may be adjusted relating to the response speed. For example, the polling frequency or push frequency of the sensor is increased and/or the message frequency (e.g. a cap on the maximum number of messages sent by the controller) is increased.

After the user exits from high sensitivity mode, the settings are then returned to normal operational mode settings.

Exiting from mode can be triggered by timing.

In one example, the high sensitivity mode is only active for a fixed time such as 3 minutes.

In another example the mode is terminated after a certain duration, for example 1 minute, after the detection of last trigger.

The user may opt to repeat or extend the mode using the device 16.

In another example, the end of the mode may be triggered by user interaction using the device 16.

Optionally the application running on the device 16 may for example provide a specific screen related to the high sensitivity mode, in which readouts from the sensor are plotted and trigger events are logged. Such a screen could also offer the user the option to change the trigger value or values as well as the sensitivity.

For example, the user may be able to transition from high sensitivity to normal sensitivity, but stay in a fast response mode until completed testing and configuration is complete.

The high sensitivity mode is described above as implemented automatically when a new sensor is installed in the system. The system is aware that a new sensor is being installed because the user initiates a sensor installation procedure using their user interface (e.g. smartphone). Thus, the high sensitivity mode is started and stopped by the user interface application on the smartphone or other user interface device.

The user may additionally instigate the high sensitivity mode at any time, simply to check the correct functioning of an already-installed sensor, for example when making sensor adjustments such as changes to angle, range, or sensitivity of a presence sensor.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Any reference signs in the claims should not be construed as limiting the scope.

The invention claimed is:

1. A lighting system controller for controlling a networked lighting system comprising one or more lighting units, the lighting system controller arranged for:
   enabling addition, by a user, of a sensor as a new network node to the networked lighting system,
   receiving sensor information from the sensor, and
   providing wireless control signals to the one or more lighting units in dependence upon the received sensor information,
wherein the lighting system controller is further arranged for:
   in response to addition of the sensor, temporarily switch from a normal operation mode to a high sensitivity mode for assisting the user in testing the sensor function,
wherein in the high sensitivity mode the lighting system controller is arranged for increasing the frequency of the polling of the sensor such that there is an increased frequency of communications between the lighting system controller and the sensor compared to the frequency of communications in the normal operational mode.

2. A lighting system controller as claimed in claim 1, wherein in the high sensitivity mode the networked lighting system is arranged for operating with a changed sensor threshold level, and wherein the changed threshold level comprises a reduced hysteresis between sensor output transitions.

3. A lighting system controller as claimed in claim 2, in which the hysteresis is set to zero.

4. A lighting system controller as claimed in claim 1, wherein in the high sensitivity mode the networked lighting system is arranged for operating with a changed sensor threshold, and wherein the changed threshold level comprises a reduced delay between sensor output transitions.

5. A lighting system controller as claimed in claim 4, in which the delay is set to zero.

6. A lighting system controller as claimed in claim 1, wherein the high sensitivity mode ends after a fixed time period or wherein the high sensitivity mode ends based on receiving a user input.

7. A lighting system comprising:
a lighting system controller as claimed in claim 1;
one or more lighting units; and
one or more sensors, wherein the one or more lighting units, the one or more sensors and the lighting system controller form a network.

8. A lighting system as claimed in claim 7, comprising an output device for assisting the user in testing the sensor function, wherein the output device comprises:
at least one of the one or more lighting units; and/or
a portable display device for providing performance information to the user; and/or
a speaker.

9. A method of operating a lighting system controller for controlling a networked lighting system comprising one or more lighting units, the method comprising:
detecting the addition of a sensor, by a user, as a new network node to the networked lighting system;
receiving sensor information from the sensor,
providing wireless control signals to the one or more lighting units in dependence upon the received sensor information, and
in response to addition of the sensor, temporarily switch from a normal operation mode to a high sensitivity mode for assisting the user in testing the sensor function,
wherein in the high sensitivity mode the networked lighting system increases the frequency of the polling of the sensor such that there is an increased frequency of communications between the lighting system controller and the sensor compared to the frequency of communications in the normal operational mode.

10. A method as claimed in claim 9, wherein in the high sensitivity mode the networked lighting system operates with a changed sensor threshold level, and wherein the changed threshold level comprises a reduced hysteresis between sensor output transitions.

11. A method as claimed in claim 9, wherein in the high sensitivity mode the networked lighting system operates with a changed sensor threshold level, and wherein the changed threshold level comprises a reduced delay between sensor output transitions.

12. A method as claimed in claim 9, wherein the high sensitivity mode ends after a fixed time period or wherein the high sensitivity mode ends based on receiving a user input.

13. A computer program product comprising code stored on a non-transitory computer readable storage medium and configured when executed to implement the method of claim 9.

* * * * *